(12) United States Patent
Giles et al.

(10) Patent No.: US 10,226,996 B2
(45) Date of Patent: Mar. 12, 2019

(54) FILLER NECK CLOSURE ASSEMBLY

(71) Applicant: Stant USA Corp., Connersville, IN (US)

(72) Inventors: Adam Giles, Connersville, IN (US); Keith Kubicek, Batesville, IN (US)

(73) Assignee: Stant USA Corp., Connersville, IN (US)

( * ) Notice: Subject to any disclaimer, the term of this patent is extended or adjusted under 35 U.S.C. 154(b) by 342 days.

(21) Appl. No.: 14/817,390

(22) Filed: Aug. 4, 2015

(65) Prior Publication Data

US 2016/0031317 A1 Feb. 4, 2016

Related U.S. Application Data

(60) Provisional application No. 62/032,990, filed on Aug. 4, 2014.

(51) Int. Cl.
*B60K 15/04* (2006.01)

(52) U.S. Cl.
CPC ...... *B60K 15/04* (2013.01); *B60K 2015/0429* (2013.01); *B60K 2015/0461* (2013.01)

(58) Field of Classification Search
CPC .................... B60K 15/05; B60K 15/04; B60K 2015/0515; B60K 2015/0429; B60K 2015/0461
USPC ...................................... 220/86.2, 86.1, 86.3
See application file for complete search history.

(56) References Cited

U.S. PATENT DOCUMENTS

| | | | |
|---|---|---|---|
| 5,730,194 A | 3/1998 | Foltz | |
| 5,732,840 A | 3/1998 | Foltz | |
| 6,189,581 B1 | 2/2001 | Harris et al. | |
| RE37,776 E | 7/2002 | Foltz | |
| 6,446,826 B1 * | 9/2002 | Foltz | B60K 15/04 220/203.01 |
| 6,554,150 B2 * | 4/2003 | Foltz | B60K 15/0406 220/255 |
| 6,679,396 B1 * | 1/2004 | Foltz | B60K 15/04 141/301 |
| 6,691,750 B1 * | 2/2004 | Foltz | B60K 15/04 141/348 |
| 6,755,057 B2 | 6/2004 | Foltz | |
| 6,923,224 B1 * | 8/2005 | McClung | B60K 15/035 141/350 |

(Continued)

FOREIGN PATENT DOCUMENTS

| | | |
|---|---|---|
| DE | 4039269 C1 | 2/1992 |
| DE | 102007000455 A1 | 3/2008 |

(Continued)

OTHER PUBLICATIONS

PCT International Search Report and Written Opinion completed by the ISA/US dated Sep. 25, 2015 and issued in connection with PCT/US2015/043357.

(Continued)

*Primary Examiner* — King M Chu
(74) *Attorney, Agent, or Firm* — Barnes & Thornburg LLP

(57) ABSTRACT

A filler neck closure assembly includes a nozzle-receiving housing associated with a vehicle fuel tank filler neck. The nozzle-receiving housing is formed to include a central housing passageway sized to receive the tip of a fuel-dispensing pump nozzle therein during refueling of the fuel tank.

22 Claims, 9 Drawing Sheets

(56) References Cited

U.S. PATENT DOCUMENTS

| | | | | |
|---|---|---|---|---|
| 7,182,111 B2* | 2/2007 | McClung | ............... | B60K 15/04 |
| | | | | 141/301 |
| 7,246,642 B2 | 7/2007 | Foltz et al. | | |
| 7,882,862 B2 | 2/2011 | DeCapua et al. | | |
| 7,926,522 B2* | 4/2011 | Aitken | ................... | B60K 15/04 |
| | | | | 141/301 |

FOREIGN PATENT DOCUMENTS

| | | | |
|---|---|---|---|
| EP | 1690727 | A2 | 8/2006 |
| EP | 2322373 | A1 | 5/2011 |

OTHER PUBLICATIONS

Supplementary European Search Report for Application No. 15829140.1-1012/3177532, dated Feb. 26, 2018, 8 pages.

* cited by examiner

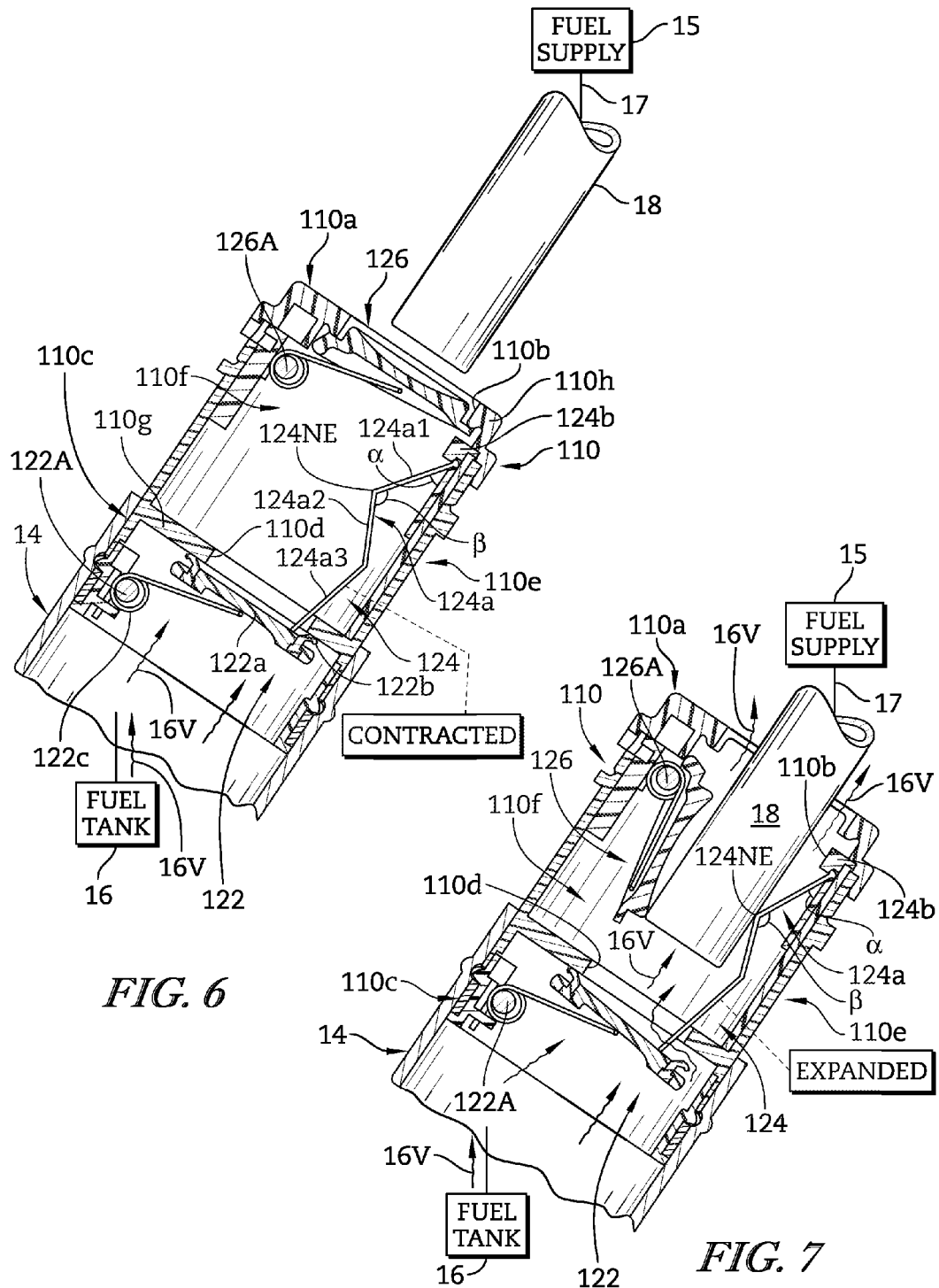

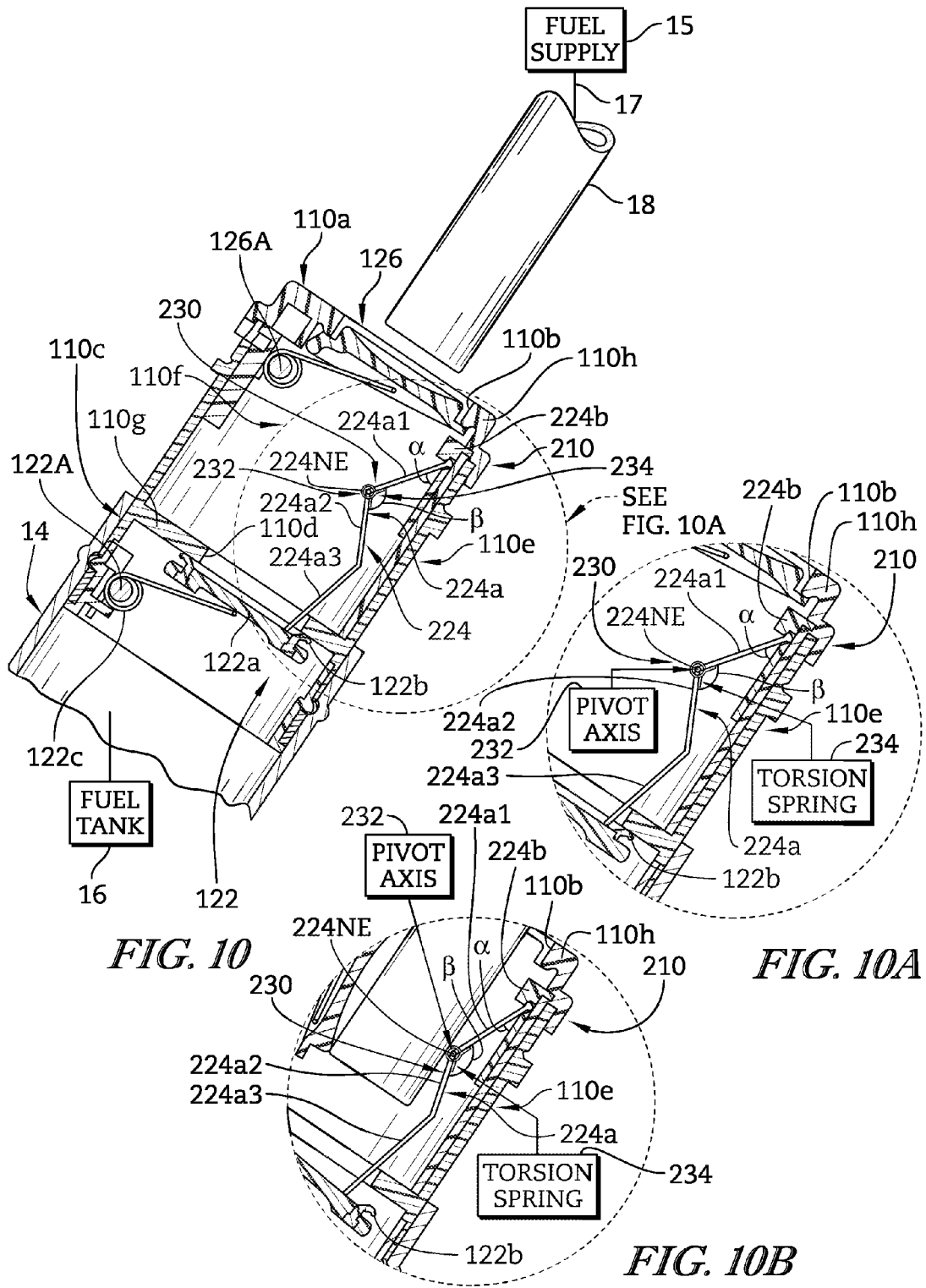

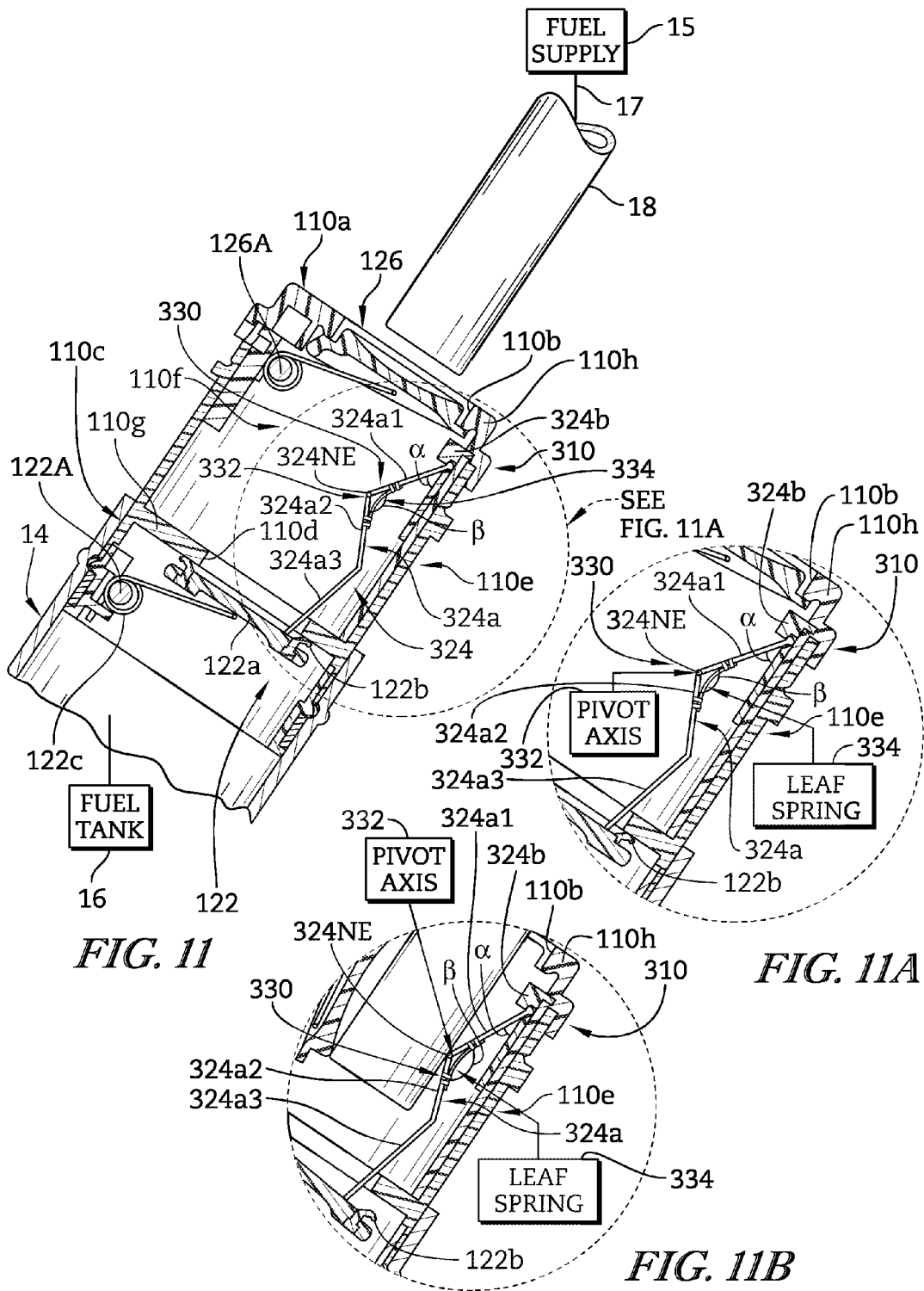

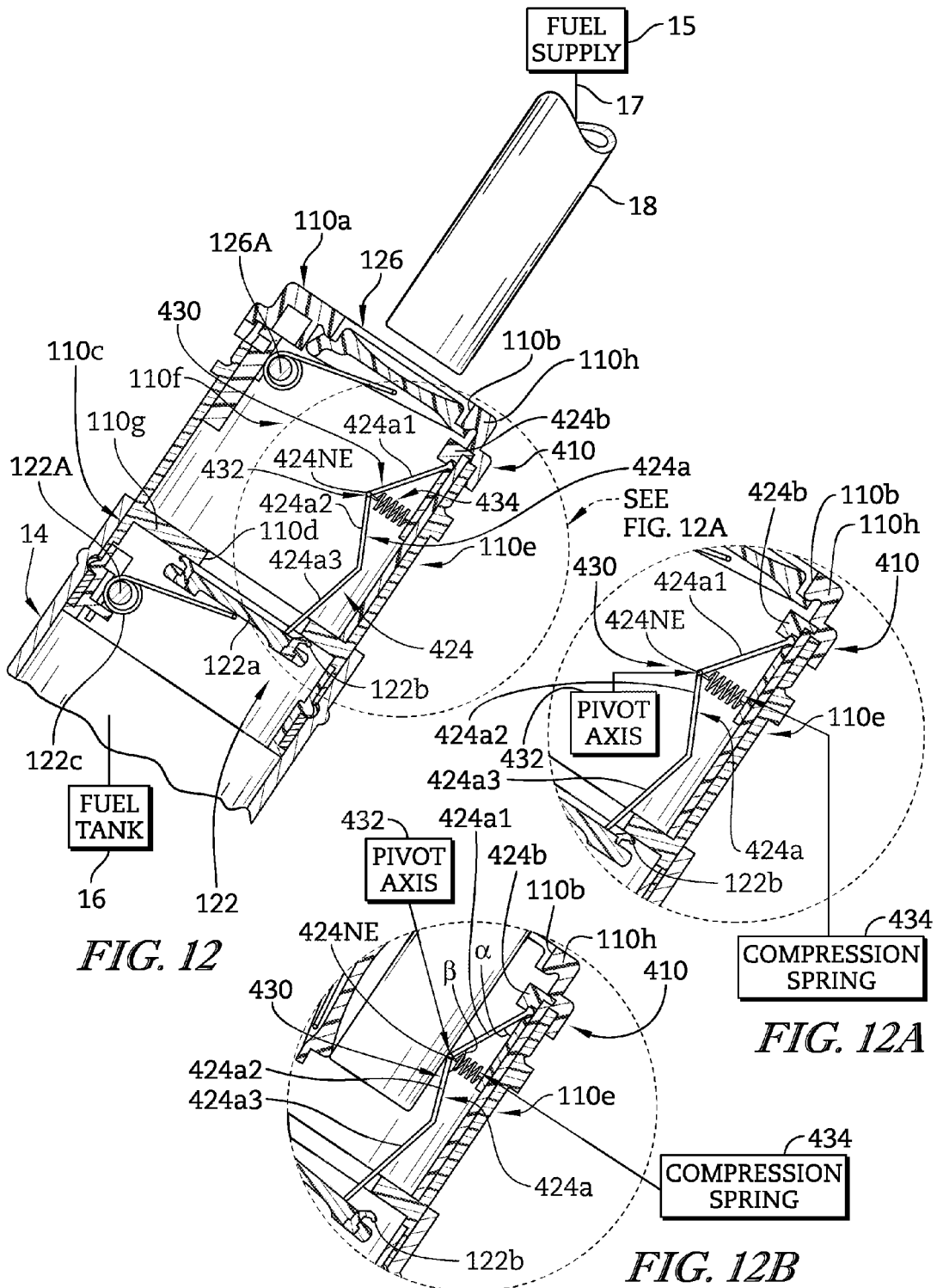

FILLER NECK CLOSURE ASSEMBLY

PRIORITY CLAIM

This application claims priority under 35 U.S.C. § 119(e) to U.S. Provisional Application Ser. No. 62/032,990, filed Aug. 4, 2014, which is expressly incorporated by reference herein.

BACKGROUND

The present disclosure relates to a filler neck closure system for a fuel tank, and particularly to a filler neck closure for use with a vehicle fuel tank filler neck. More particularly, the present disclosure relates to a capless filler neck closure for a fuel tank filler neck.

SUMMARY

According to the present disclosure, a filler neck closure assembly includes a nozzle-receiving housing associated with a vehicle fuel tank filler neck. The nozzle-receiving housing is formed to include a central housing passageway sized to receive the tip of a fuel-dispensing pump nozzle therein during refueling of the fuel tank.

In illustrative embodiments, the filler neck closure assembly is capless and coupled to an outer end of the filler neck. The filler neck closure assembly and filler neck cooperate to define a fill tube for conducting liquid fuel from a nozzle to a fuel tank onboard a vehicle.

In illustrative embodiments, a movable outer dust shield normally closes an outer nozzle receiver formed in the nozzle-receiving housing and a movable inner closure door normally closes an inner nozzle receiver formed in the nozzle-receiving housing. The movable inner closure door is arranged to open into a fuel-conducting passageway formed in the filler neck. A nozzle-actuated door opener included in the filler neck closure assembly is located in the central housing passageway between the outer dust shield and inner closure door. The nozzle-actuated door opener is linked to the inner closure door and is inactive until actuated by a fuel-dispensing pump nozzle moving in the central housing passageway.

In illustrative embodiments, during insertion of a fuel-dispensing pump nozzle into the central housing passageway formed in the nozzle-receiving housing, the nozzle first moves the outer dust shield to an opened position. The inwardly moving nozzle then engages and moves the nozzle-actuated door opener that is linked to the inner closure door relative to the nozzle-receiving housing to cause the inner closure door to move to a partly opened position without being touched by the nozzle. Movement to the partly opened position begins venting of pressurized fuel vapor from the fuel-tank filler neck to the atmosphere. In that partly opened position, any pressurized fuel vapor extant in the fuel-tank filler neck can flow through the central passageway in a metered manner to the atmosphere or other destination. Further inward movement of the nozzle will push the inner closure door to an opened position so that the tip of the nozzle extends into the filler neck and fuel discharged from the nozzle can flow through the filler neck to reach the fuel tank.

In illustrative embodiments, during withdrawal of the fuel-dispensing pump nozzle from the central housing passageway after the fuel tank has been refueled, the nozzle disengages the inner closure door but remains engaged with the nozzle-actuated door opener that is linked to the inner closure door for a short period of time so that the inner closure door is held in a partly opened position by the nozzle-actuated door opener even though the nozzle no longer touches the inner closure door. This allows any droplets of fuel that are discharged from the nozzle as the nozzle is withdrawn to flow under gravity past the partly opened inner closure door and drain into the filler neck. Formation of unwanted pools of liquid fuel in the central housing passageway after closure of the inner closure door is avoided.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 6-9 show movement of a fuel-dispensing nozzle into and out of a nozzle-receiving housing included in an illustrative capless filler neck closure assembly of the type shown diagrammatically in FIGS. 2-5;

FIG. 6 is a sectional view of a capless filler neck closure assembly in accordance with the present disclosure showing that a spring-loaded outer dust shield is CLOSED, a spring-loaded inner closure door is CLOSED, and an INACTIVE nozzle-actuated door opener located between the shield and the door and configured to include a bent leaf spring before a fuel-dispensing pump nozzle coupled to a fuel supply is inserted into the capless filler neck closure assembly to supply fuel to a fuel tank;

FIG. 7 is a view similar to FIG. 6 showing that the nozzle has opened the outer dust shield and caused the nozzle-actuated door opener to pivot the spring-loaded inner closure door to a PARTLY OPENED position to allow a metered flow of pressurized fuel vapor to flow outwardly from the fuel tank and the filler neck past the PARTLY OPENED inner closure door so that discharge of pressurized fuel vapor from the fuel tank to the atmosphere is regulated during nozzle insertion;

FIG. 8 is a view similar to FIGS. 6 and 7 showing discharge of fuel from the fuel supply into the fuel tank during a tank-refueling activity;

FIG. 9 is a view similar to FIGS. 6-8 during withdrawal of the nozzle from the capless filler neck closure assembly at the end of a tank-refueling activity and showing that the nozzle engages the nozzle-actuated door opener to cause the inner closure door to be maintained in a PARTLY OPENED position after the nozzle has disengaged the inner closure door so that any droplets of fuel that exit the nozzle as the nozzle is withdrawn from the capless filler neck closure assembly fall under gravity past the PARTLY OPENED inner closure door and drain into the fuel tank filler neck without forming a pool of liquid fuel in the capless filler neck closure assembly;

FIG. 10 is a sectional view of a second illustrative capless filler neck closure assembly in accordance with the present disclosure;

FIG. 10A is a detail view of a portion of FIG. 10;

FIG. 10B is a detail view similar to FIG. 10A;

FIG. 11 is a sectional view of a third illustrative capless filler neck closure assembly in accordance with the present disclosure;

FIG. 11A is a detail view of a portion of FIG. 11;

FIG. 11B is a detail view similar to FIG. 11A;

FIG. 12 is a sectional view of a fourth illustrative capless filler neck closure assembly in accordance with the present disclosure;

FIG. 12A is a detail view of a portion of FIG. 12; and

FIG. 12B is a detail view similar to FIG. 12A.

DETAILED DESCRIPTION

Figure 1:
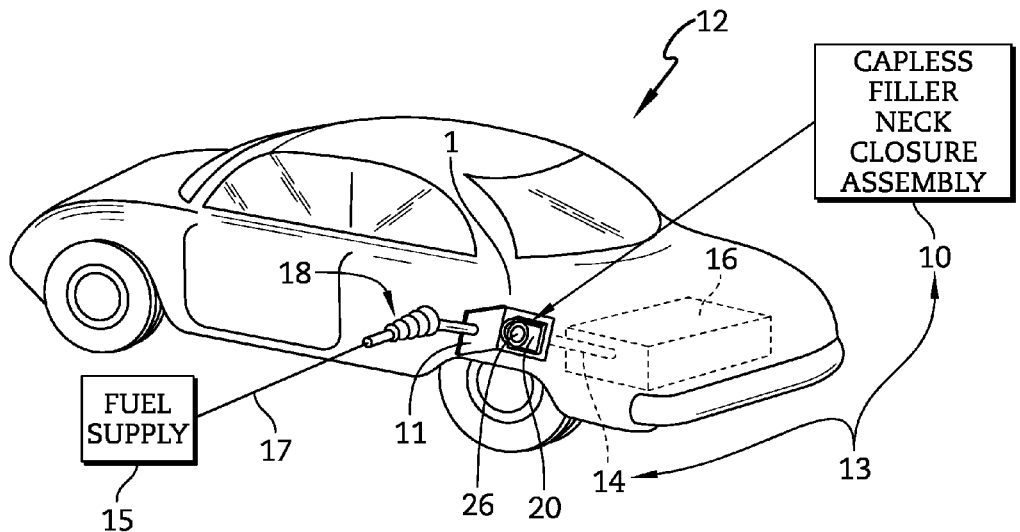
FIG. 1 is a perspective view of a vehicle showing an outer filler neck access door moved to an opened position relative to a vehicle body panel to expose a capless filler neck closure assembly that is coupled to a filler neck to define a fill tube leading to a vehicle fuel tank and showing a fuel-dispensing pump nozzle about to be inserted into the filler neck closure assembly during vehicle refueling to discharge liquid fuel into the filler neck leading to the vehicle fuel tank.

A filler neck closure assembly 10 is provided in a vehicle 12 to close a filler neck 14 extending from a fuel tank 16 onboard the vehicle 12 and to accept a fuel-dispensing pump nozzle 18 during fuel tank refueling as suggested in FIG. 1. Filler neck closure assembly 10 cooperates with filler neck 14 to define a fill tube 13 for conducting liquid fuel 18L from nozzle 18 to fuel tank 16. A capless filler neck closure assembly 110 in accordance with an illustrative embodiment of the present disclosure is shown in FIGS. 6-9.

Figure 2:
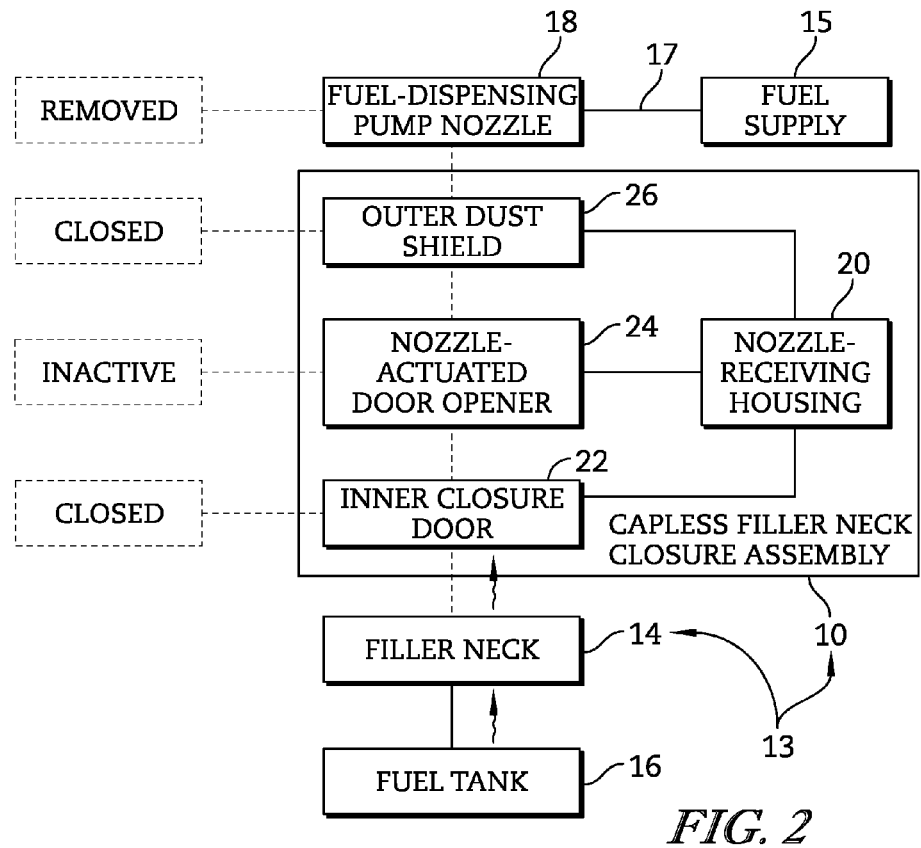
FIG. 2 is a diagrammatic view of a vehicle fuel management system of the type suggested in FIG. 1 showing that the capless filler neck closure assembly includes a nozzle-actuated door opener that is located between a movable outer dust shield and a movable inner closure door and is normally INACTIVE until actuated by a moving fuel-dispensing pump nozzle (a) during insertion of the nozzle into a nozzle-receiving housing included in the capless filler neck closure assembly to move the inner closure door to a PARTLY OPENED position and an OPENED position as suggested in FIGS. 3 and 4 and (b) during withdrawal of the nozzle from the nozzle-receiving housing so that any fuel droplets discharged from the nozzle flow past the PARTLY OPENED inner closure door and drain into the filler neck as suggested in FIG. 5 without forming an unwanted trapped pool of fuel in the capless filler neck closure assembly.

Filler neck closure assembly 10 includes a nozzle-receiving housing 20 coupled to an outer end of filler neck 14 as suggested in FIGS. 1 and 2. Filler neck closure assembly 10 also includes an inner closure door 22 that is normally closed as suggested in FIG. 2 and is movable to open an inner nozzle receiver formed in nozzle-receiving housing 20 to communicate with filler neck 14 as suggested in FIG. 4. A nozzle-actuated door opener 24 is also included in filler neck closure assembly 10 and is arranged to be activated by movement of fuel-dispensing pump nozzle 18 in filler neck closure assembly 10 to move inner closure door 22 to a PARTLY OPENED position when fuel-dispensing pump nozzle 18 is inserted into nozzle-receiving housing 20 but is not in direct contact with inner closure door 22 as suggested in FIGS. 3 and 5.

Figure 3:
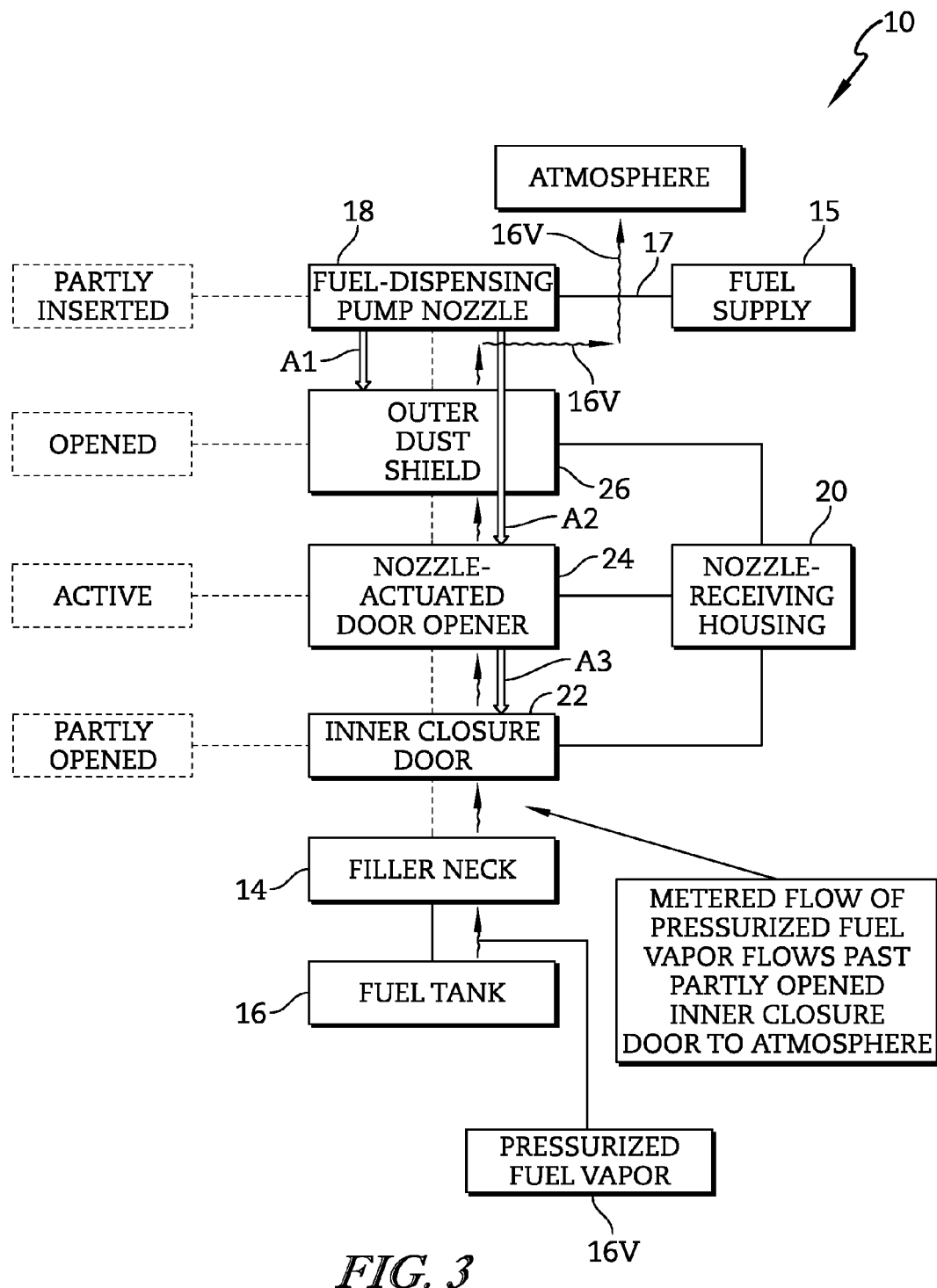
FIG. 3 is a view similar to FIG. 2 suggesting that partial insertion of the fuel-dispensing pump nozzle into the nozzle-receiving housing causes the fuel-dispensing pump nozzle (a) to engage the outer dust shield and move the outer dust shield to an OPENED position and (b) to engage the nozzle-actuated door opener and cause the now-active door opener to become ACTIVE by engaging and moving the inner closure door to a PARTLY OPENED position and allow pressurized fuel vapor in the filler neck to vent through the filler neck closure assembly to the atmosphere in a controlled manner before the inwardly moving nozzle engages and moves the inner closure door to an OPENED position as suggested in FIG. 4.

Nozzle-actuated door opener 24 is configured to move inner closure door 22 to a PARTLY OPENED position when engaged by a moving nozzle 18 during nozzle insertion into filler neck 14 to vent pressurized fuel vapor 16V from fuel tank 16 via filler neck 14 to the atmosphere in a metered manner as suggested diagrammatically in FIG. 3. Nozzle-actuated door opener 24 is also configured to hold inner closure door 22 in a PARTLY OPENED position during withdrawal of nozzle 18 from filler neck 14 so that any fuel droplets 18D dripping from nozzle 18 flow past the PARTLY OPENED inner closure door 22 and drain into the filler neck 14 for delivery to fuel tank 16 as the nozzle 18 is being withdrawn as suggested diagrammatically in FIG. 5.

Filler neck closure assembly 10 is a capless system as suggested diagrammatically in FIG. 2. In such a capless system, instead of providing a removable fuel cap for the filler neck 14, an inner closure door 22 is mounted for movement relative to the nozzle-receiving housing 20 to open and close an inner aperture opening into the filler neck 14 in response to inward and outward movement of the fuel-dispensing pump nozzle 18 relative to filler neck 14.

During refueling of fuel tank 16, an outer fill-tube access door 11 is moved by a refueling attendant relative to a vehicle body panel 19 to expose the capless filler neck closure assembly 10 of the fill tube 13 as shown, for example, in FIG. 1. Filler neck closure assembly 10 is illustratively located in a chamber formed in vehicle 12 as suggested in FIG. 1 so that assembly 10 is out of sight when fill-tube access door 11 is closed.

Figure 4:
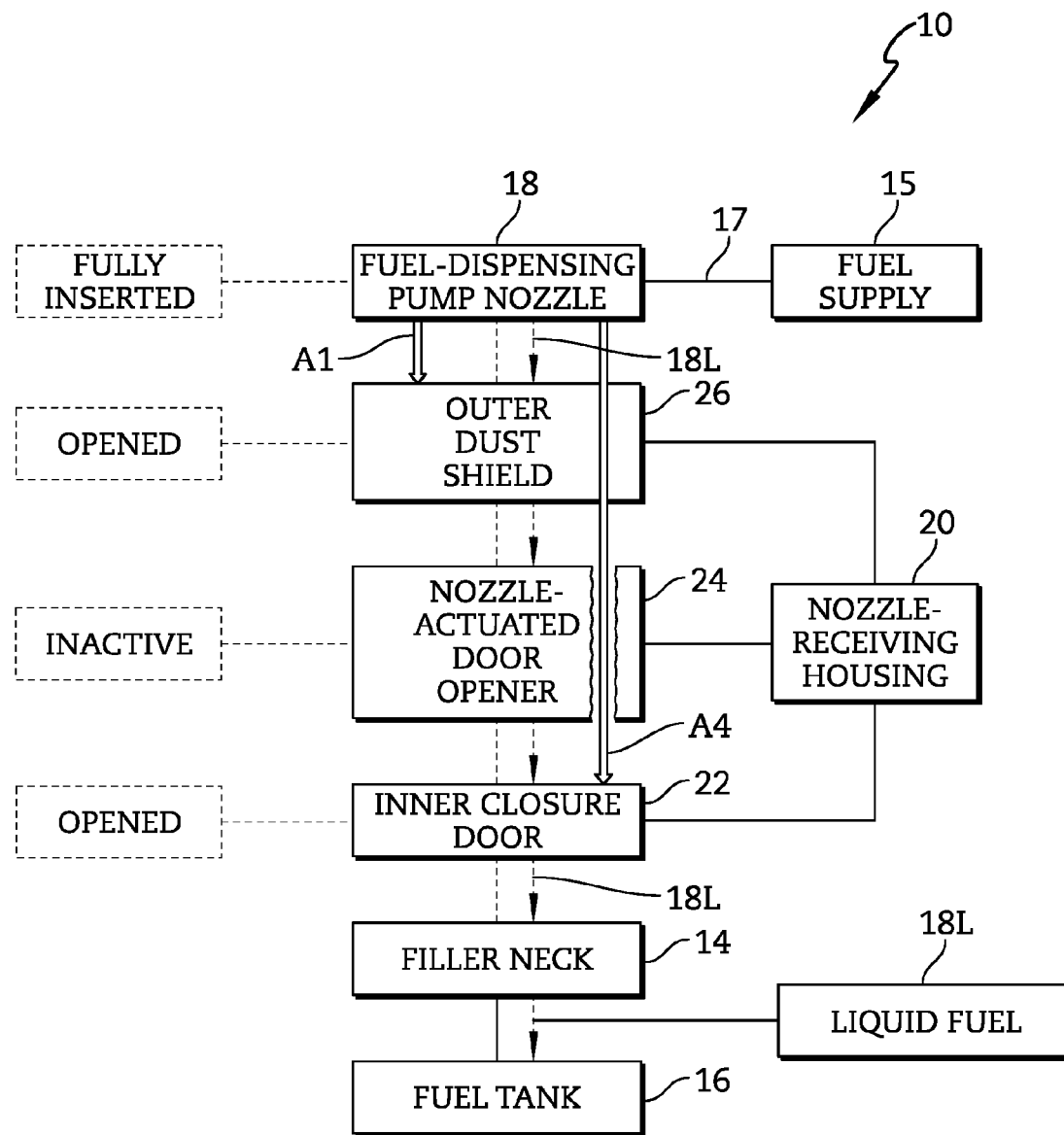
FIG. 4 is a view similar to FIGS. 2 and 3 after full insertion of the fuel-dispensing pump nozzle into the nozzle-receiving housing causes the nozzle to engage the inner closure door and move the inner closure door from the PARTLY OPENED position to an OPENED position and showing that liquid fuel dispensed by the nozzle flows into and through the filler neck to reach the fuel tank.

Fuel-dispensing pump nozzle 18 is configured to be inserted into the capless filler neck closure assembly 10 during tank refueling to discharge liquid fuel 18L into the filler neck 14 so the at fuel tank 16 can be filled with liquid fuel 18L as suggested in FIG. 4. Fuel-dispensing pump nozzle 18 is coupled to a fuel supply 15 by a hose 17 as suggested in FIG. 1.

Nozzle-actuated door opener 24 provided in accordance with the present disclosure and associated with nozzle-receiving housing 20 functions: (1) to cause the inner closure door 22 to move from a CLOSED position to a PARTLY OPENED position to vent pressurized fuel vapor 16V from fuel tank 16 via fuel-tank filler neck 14 during insertion of nozzle 18 into filler neck 14 is suggested diagrammatically in FIGS. 2 and 3 and (2) to cause the inner closure door 22 to remain in a PARTLY OPENED position to allow any fuel droplets 18D dripping from the nozzle 18 to drain into the filler neck 14 for delivery to fuel tank 16 during withdrawal of nozzle 18 from the filler neck 14 at the conclusion of a tank refueling activity as suggested diagrammatically in FIG. 5.

Capless filler neck closure assembly 10 further includes an outer dust shield 26 a suggested in FIG. 2. Outer dust shield 26 provides an outer closure door that is mounted for movement relative to nozzle-receiving housing 20 to open and close an outer aperture opening into an interior region formed in nozzle-receiving housing 20 in response to inward and outward movement of the fuel-dispensing pump nozzle 18 in nozzle-receiving housing 20 relative to filler neck 14. In illustrative embodiments, nozzle-actuated door opener 24 is separated from outer dust shield 26 and linked to inner closure door 22 as suggested diagrammatically in FIGS. 3 and 5.

Before a tank-refueling attendant begins to refuel fuel tank 16, outer dust shield 26 and inner closure door 22 are maintained in CLOSED positions on nozzle-receiving housing 20 as suggested in FIG. 2. Nozzle-actuated door opener 24 is arranged to lie between outer dust shield 26 and inner closure door 22 in an INACTIVE position as suggested in FIG. 2 until nozzle-actuated door opener 24 intercepts and engages an inwardly moving fuel-dispensing pump nozzle 18 after outer dust shield 26 has been moved to an OPENED position as suggested in FIG. 3.

Partial insertion of fuel-dispensing pump nozzle 18 into capless filler neck closure assembly 10 during an early stage of a tank-refueling activity is shown diagrammatically in FIG. 3. Nozzle 18 has engaged outer dust shield 26 as suggested by double arrow A1 and moved outer dust shield 26 to an OPENED position. Nozzle 18 has also engaged nozzle-actuated door opener 24 as suggested by double arrow A2 causing nozzle-actuated door opener 24 to move inner closure door 22 to a PARTLY OPENED position as suggested by double arrow A3 owing to a pre-existing link established between nozzle-actuated door opener 24 and inner closure door 22 as suggested diagrammatically in FIG. 3.

Full insertion of fuel-dispensing pump nozzle 18 into capless filler neck closure assembly 10 and filler neck 14 during a later stage of a tank-refueling activity is shown diagrammatically in FIG. 4. Nozzle 18 has now engaged inner closure door 22 and caused inner closure door 22 to move from a PARTLY OPENED position to an OPENED position as suggested in FIG. 4. Liquid fuel 18F is discharged from nozzle 18 into filler neck 14 for delivery to fuel tank 16. During this later stage, outer dust shield 26 remains in OPENED position owing to continued engagement with nozzle 18 as suggested by double arrow A1. Also, nozzle-actuated door opener 24 is INACTIVE because inner closure door 22 is maintained in the OPENED position owing to engagement with nozzle 18.

Figure 5:
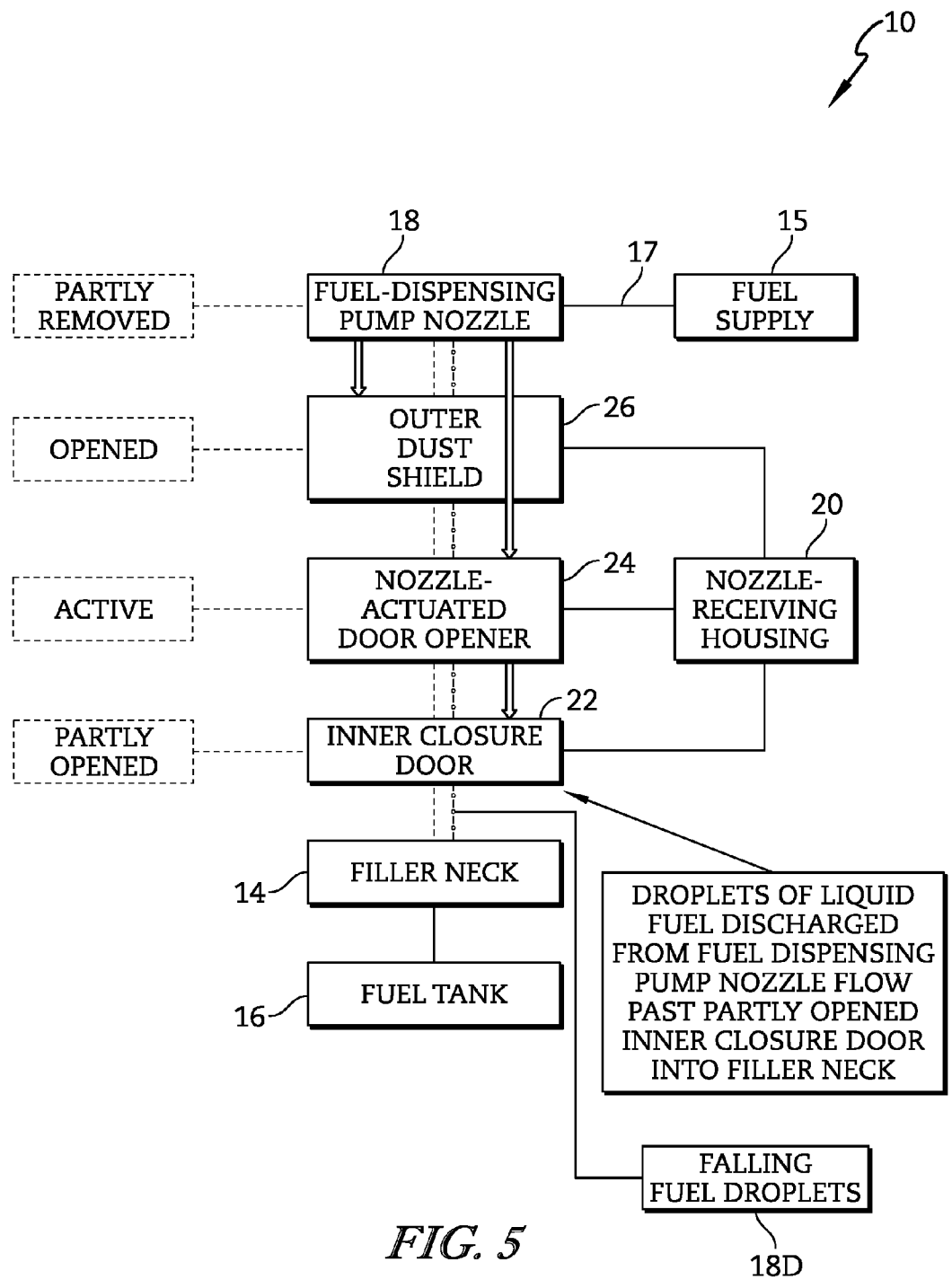
FIG. 5 is a view similar to FIGS. 2-4 during withdrawal of the fuel-dispensing pump nozzle from the nozzle-receiving housing and suggesting that the nozzle-actuated door opener is ACTIVE once again owing to engagement with the withdrawing nozzle to cause the inner closure door to remain in a PARTLY OPENED position even though the nozzle has disengaged the inner closure door so that any fuel droplets that may be exiting the nozzle will flow under gravity past the PARTLY OPENED inner closure door and drain into the filler neck without pooling in the nozzle-receiving housing after movement of the inner closure door to a CLOSED position.

Partial removal (withdrawal) of fuel-dispensing pump nozzle 18 from a fill tube 13 comprising nozzle-receiving housing 20 and filler neck 14 during a final stage of a tank-refueling activity is shown diagrammatically in FIG. 5. In this final stage, the nozzle-actuated door opener 24 is once again ACTIVE owing to engagement with the withdrawing nozzle 18 to cause the inner closure door 22 to remain PARTLY OPENED so that any fuel droplets 18D that may be exiting nozzle 18 will flow under gravity past the partly opened inner closure door 22 and drain into filler neck 14 without pooling in nozzle-receiving housing 20 after movement of inner closure door 22 to a CLOSED position.

An illustrative fill tube 113 in accordance with the present disclosure is shown in FIGS. 6-9. As suggested in FIG. 6, a filler neck closure assembly 110 included in fill tube 113 is coupled to an outer end of a fuel-tank filler neck 14 also included in fill tube 113.

Filler neck closure assembly 110 includes a nozzle-receiving housing 120 and an inner closure door 122 mounted for movement to open and close an inner nozzle receiver 110d formed in nozzle-receiving housing 120 in an illustrative embodiment shown in FIG. 6. In illustrative embodiments, filler neck closure assembly 110 is capless and also includes an outer dust shield 126 mounted for movement to open and close an outer nozzle receiver 110b formed in nozzle-receiving housing 120 as also suggested in FIG. 6.

Nozzle-receiving housing 120 of filler neck closure assembly 110 includes a top portion 110a formed to include an outer nozzle receiver 110b (e.g. aperture), a bottom portion 110c formed to include an inner nozzle receiver 110d (e.g., aperture), and an annular side wall 110e. Side wall 110e is arranged to interconnect top and bottom portions 110a, 110c and cooperate therewith to form an interior region 110f therebetween as suggested in FIG. 6. Interior region 110f provides a central housing passageway extending through housing 120 and interconnecting outer and inner nozzle receivers 110b, 110d.

Figure 8:
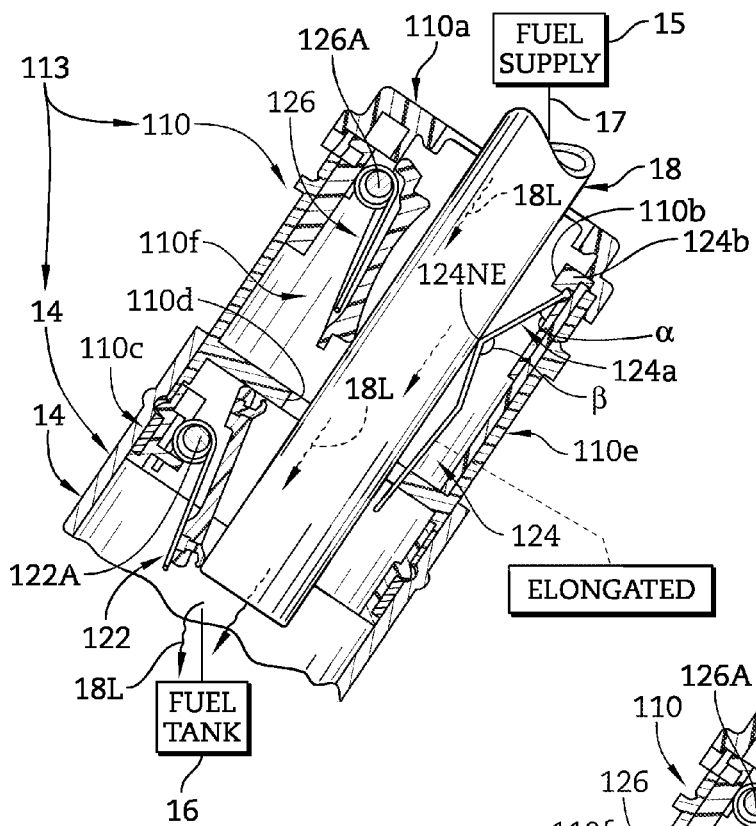
Figure 9:
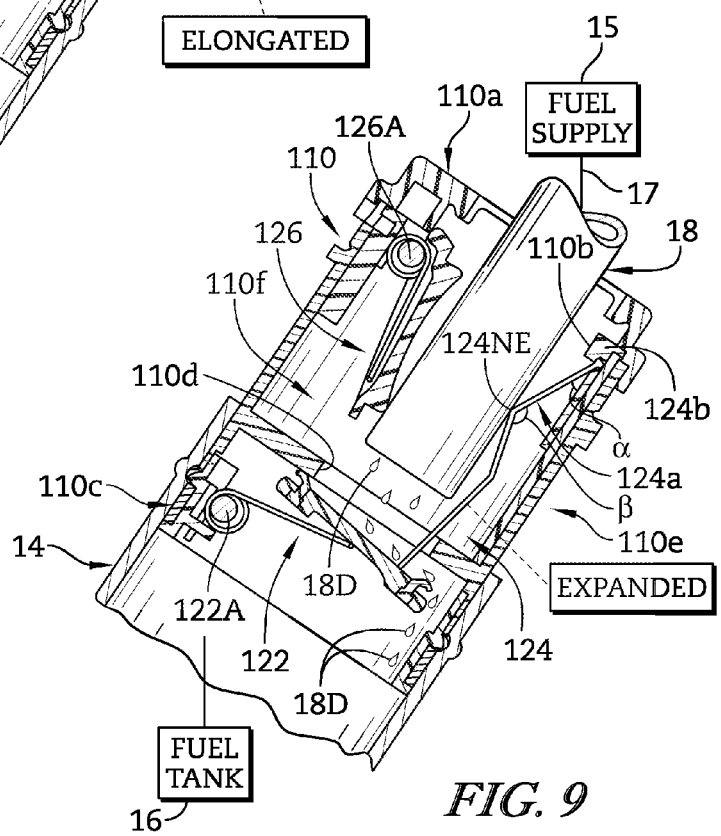

Inner closure door 122 of filler neck closure assembly 110 is arranged to move about pivot axis 122A between a CLOSED position shown in FIG. 6, PARTLY OPENED positions shown in FIGS. 7 and 9, and an OPENED position shown in FIG. 8. In illustrative embodiments, inner closure door 122 includes a plate 122a, an O-ring seal 122b carried on plate 122a and arranged to mate with an inner wall 110g formed to include inner nozzle receiver 110d, and a spring 122c arranged to urge plate 122a and O-ring seal 122b normally and yieldably to the CLOSED position engaging inner wall 110g as shown, for example, in FIG. 6.

Outer dust shield 126 of filler neck closure assembly 110 is arranged to move about pivot axis 26A between a CLOSED position shown in FIG. 6 and OPENED positions shown in FIGS. 7-9. In illustrative embodiments, outer dust shield 126 is an outer closure door including a plate 126a, an O-ring seal 126b carried on plate 126a and arranged to mate with an outer wall 110h formed to include outer nozzle receiver 110b, and a spring 126c arrange to urge plate 126a and O-ring seal 126b normally and yieldably to the CLOSED position engaging outer wall 110h as shown, for example, in FIG. 6.

Nozzle-actuated door opener 124 is coupled at one end to side wall 110e of nozzle-receiving housing 120 and linked at an opposite end to plate 122a of inner closure door 122 in illustrative embodiments as suggested in FIGS. 6-9. Door opener 124 includes a door mover 124a comprising outer, middle, and inner segments 124a1, 124a2, and 124a3 and a mover mount 124b coupled to side wall 110e of nozzle-receiving housing 120 and to outer segment 124a1 of door mover as suggested in FIG. 6. Door mover 124a is arranged to lie mostly in the central housing passageway defined by interior region 110f of nozzle-receiving housing 120 during operation thereof as suggested in FIGS. 6-9.

In illustrative embodiments, door mover 124a is made of an elastic deformable material and outer and middle segments 124a1, 124a2 cooperate to form nozzle-engagement means 124NE for engaging a fuel-dispensing pump nozzle 18 moving in the interior region (e.g., central housing passageway) 110f of the nozzle-receiving housing 120 to deform elastically and change the shape of the door mover from a CONTRACTED shape shown in FIG. 6 and associated with the CLOSED position of the inner closure door 122 to a relatively longer (along interior region 1100 EXPANDED shape shown in FIGS. 7 and 9 and associated with the PARTLY OPENED position of the inner closure door 122 and a still longer (along interior region 1100 ELONGATED shape shown in FIG. 8 and associated with the OPENED position of the inner closure door 122. In illustrative embodiments, a distal tip (i.e., free end) of inner segment 124a engages plate 122a of inner closure door 122 as suggested in FIG. 6. When door mover 124a is deformed by a moving nozzle 18 and changes shape as suggested in FIGS. 7-9, the distal tip of inner segment 124a3 moves toward filler neck 14 to move inner closure door 122 about pivot axis 122A to PARTLY OPENED positions shown in FIGS. 7 and 9 and to an OPENED position shown in FIG. 8. Once nozzle 18 is removed from nozzle-receiving housing 120, door mover 124a returns to its CONTRACTED shape shown in FIG. 6 to allow inner closure door 122 to move to the CLOSED position.

Outer segment 124a1 extends from side wall 110E of the nozzle-receiving housing 120 to form an acute angle α with the side wall 110E that is reduced when the door mover 124a moves (i.e., changes) from the CONTRACTED shape to the EXPANDED shape and further reduced when the door mover 124a moves (i.e., changes) to the ELONGATED shape as shown in FIGS. 6-9. Middle segment 124a2 extends from outer segment 124a1 back toward side wall 110E and forms an obtuse angle β with outer segment 124a1 that is increased when door mover 124a moves (i.e., changes) from the CONTRACTED shape to the EXPANDED shape and further increased when door mover 124a moves (i.e., changes) to the ELONGATED shape. Inner segment 124a3 extends from middle segment 124a2 toward inner nozzle receiver 110d and away from a portion of the side wall 110E that is coupled to mover mount 124b.

Another illustrative filler neck closure assembly 210 is shown in FIGS. 10, 10A, and 10B. Filler neck closure assembly 210 illustratively includes a nozzle-actuated door opener 224. Nozzle-actuated door opener 224 is coupled at one end to side wall 110e of nozzle-receiving housing 120 and linked at an opposite end to plate 122a of inner closure door 122 included in filler neck closure assembly 210 as suggested in FIG. 10. Door opener 224 includes a door mover 224a comprising outer, middle, and inner segments 224a1, 224a2, and 224a3 and a mover mount 224b coupled to side wall 110e of nozzle-receiving housing 120 and to outer segment 224a1 of door mover as suggested in FIG. 10. Door mover 224a is arranged to lie mostly in the central housing passageway defined by interior region 110f of nozzle-receiving housing 120 during operation thereof as suggested in FIGS. 10A and 10B.

Door mover 224a is made up of an outer segment 224a1, a middle segments 224a2 coupled to the outer segment 224a1 to pivot about a pivot axis 232, and an inner segment 224a3 that extends from middle segment 224a2 as shown in FIG. 10. Outer and middle segments 224a1, 224a2 cooperate to provide a linkage 230. The linkage 230 provides nozzle-engagement means 224NE for engaging a fuel-dispensing pump nozzle 18 moving in the interior region 110f of the nozzle-receiving housing 120 to change shape of door mover 224a from a CONTRACTED shape shown in FIG. 10A and associated with the CLOSED position of the inner closure door 122 to a relatively longer EXPANDED shape shown in FIG. 10B and associated with the PARTLY OPENED position of the inner closure door 122. A torsion spring 234 engages outer and middle segments 224a1, 224a2 to bias door mover 224a toward the CONTRACTED shape.

Outer segment 224a1 extends from side wall 110E of the nozzle-receiving housing 120 to form an acute angle α with the side wall 110E that is reduced when the door mover 224a moves (i.e., changes) from the contracted shape to the expanded shape and is further reduced when door mover 124a moves (i.e., changes) to the elongated shape as shown in FIG. 10-10B. Middle segment 224a2 extends from outer segment 224a1 back toward side wall 110E and forms an obtuse angle β with outer segment 224a1 that is increased when door mover 224a moves (i.e., changes) from the contracted shape to the expanded shape and is further increased when door mover 224a moves (i.e., changes) to the elongated shape. Inner segment 224a3 extends from middle segment 224a2 toward inner nozzle receiver 110d and away from the side wall 110E.

Another illustrative filler neck closure assembly 310 is shown in FIGS. 11, 11A, and 11B. Filler neck closure assembly 310 illustratively includes a nozzle-actuated door opener 324. Nozzle-actuated door opener 324 is coupled at one end to side wall 110e of nozzle-receiving housing 120 and linked at an opposite end to plate 122a of inner closure door 122 included in filler neck closure assembly 210 as suggested in FIG. 11. Door opener 324 includes a door mover 324a comprising outer, middle, and inner segments 324a1, 324a2, and 324a3 and a mover mount 324b coupled to side wall 110e of nozzle-receiving housing 120 and to outer segment 324a1 of door mover as suggested in FIG. 11. Door mover 224a is arranged to lie mostly in the central housing passageway defined by interior region 110f of nozzle-receiving housing 120 during operation thereof as suggested in FIGS. 10A and 10B.

Door mover 324a is made up of an outer segment 324a1, a middle segments 324a2 coupled to the outer segment 324a1 to pivot about a pivot axis 332, and an inner segment 324a3 that extends from middle segment 324a2 as shown in FIG. 11. Outer and middle segments 324a1, 324a2 cooperate to provide a linkage 330. The linkage 330 provides nozzle-engagement means 324NE for engaging a fuel-dispensing pump nozzle 18 moving in the interior region 110f of the nozzle-receiving housing 120 to change shape of door mover 324a from a CONTRACTED shape shown in FIG. 11A and associated with the CLOSED position of the inner closure door 122 to a relatively longer EXPANDED shape shown in FIG. 11B and associated with the PARTLY OPENED position of the inner closure door 122. A leaf spring 334 engages outer and middle segments 324a1, 324a2 to bias door mover 324a toward the CONTRACTED shape.

Outer segment 324a1 extends from side wall 110E of the nozzle-receiving housing 120 to form an acute angle α with the side wall 110E that is reduced when the door mover 324a moves (i.e., changes) from the contracted shape to the expanded shape and is further reduced when door mover 324a moves (i.e., changes) to the elongated shape as shown in FIG. 11-11B. Middle segment 324a2 extends from outer segment 324a1 back toward side wall 110E and forms an obtuse angle β with outer segment 324a1 that is increased when door mover 324a moves (i.e., changes) from the contracted shape to the expanded shape and is further increased when door mover 324a moves (i.e., changes) to the elongated shape. Inner segment 324a3 extends from middle segment 324a2 toward inner nozzle receiver 110d and away from the side wall 110E.

Another illustrative filler neck closure assembly 410 is shown in FIGS. 12, 12A, and 12B. Filler neck closure assembly 410 illustratively includes a nozzle-actuated door opener 424. Nozzle-actuated door opener 424 is coupled at one end to side wall 110*e* of nozzle-receiving housing 120 and linked at an opposite end to plate 122*a* of inner closure door 122 included in filler neck closure assembly 210 as suggested in FIG. 12. Door opener 424 includes a door mover 424*a* comprising outer, middle, and inner segments 424*a*1, 424*a*2, and 424*a*3 and a mover mount 424*b* coupled to side wall 110*e* of nozzle-receiving housing 120 and to outer segment 424*a*1 of door mover as suggested in FIG. 12. Door mover 224*a* is arranged to lie mostly in the central housing passageway defined by interior region 110*f* of nozzle-receiving housing 120 during operation thereof as suggested in FIGS. 10A and 10B.

Door mover 424*a* is made up of an outer segment 424*a*1, a middle segments 424*a*2 coupled to the outer segment 424*a*1 to pivot about a pivot axis 432, and an inner segment 424*a*3 that extends from middle segment 424*a*2 as shown in FIG. 12. Outer and middle segments 424*a*1, 424*a*2 cooperate to provide a linkage 430. The linkage 430 provides nozzle-engagement means 424NE for engaging a fuel-dispensing pump nozzle 18 moving in the interior region 110*f* of the nozzle-receiving housing 120 to change shape of door mover 424*a* from a CONTRACTED shape shown in FIG. 12A and associated with the CLOSED position of the inner closure door 122 to a relatively longer EXPANDED shape shown in FIG. 12B and associated with the PARTLY OPENED position of the inner closure door 122. A compression spring 434 arranged to engage side wall 110*e* of nozzle-receiving housing 120 to bias door mover 424*a* toward the CONTRACTED shape.

Outer segment 424*a*1 extends from side wall 110E of the nozzle-receiving housing 120 to form an acute angle α with the side wall 110E that is reduced when the door mover 424*a* moves (i.e., changes) from the contracted shape to the expanded shape and further reduced when the door mover 424*a* moves (i.e., changes) to the elongated shape as shown in FIGS. 12-12B. Middle segment 124*a*2 extends from outer segment 424*a*1 back toward side wall 110E and forms an obtuse angle β with outer segment 424*a*1 that is increased when door mover 424*a* moves (i.e., changes) from the contracted shape to the expanded shape and further increased when door mover 424*a* moves (i.e., changes) to the elongated shape. Inner segment 424*a*3 extends from middle segment 424*a*2 toward inner nozzle receiver 110*d* and away from the side wall 110E.

The invention claimed is:

1. A fuel-tank filler neck closure assembly comprising
a nozzle-receiving housing formed to include a central housing passageway sized to receive therein a tip of a moving fuel-dispensing pump nozzle during refueling of a fuel tank associated with the fuel-tank filler neck closure assembly, a top portion formed to include an outer nozzle receiver opening into the central housing passageway, a bottom portion formed to include an inner nozzle receiver opening into the central housing passageway, and a side wall arranged to cooperate with the top and bottom portions to form the central housing passageway therebetween,
an inner closure door mounted for movement relative to the nozzle-receiving housing between a normally closed position blocking the inner nozzle receiver to block flow of any external fuel vapor into the central housing passageway through the inner nozzle receiver, a partly opened position allowing metered flow of any external fuel vapor into the central housing passageway through the inner nozzle receiver, and an opened position allowing flow of any external fuel vapor into the central housing passageway through the inner nozzle receiver, and
a nozzle-actuated door opener located in the central housing passageway of the nozzle-receiving housing and configured to provide means for moving the inner closure door from the normally closed position to the partly opened position in response to movement of the tip of the moving fuel-dispensing pump nozzle in sequence through the outer closure receiver and the central housing passageway to allow any external pressurized fuel vapor to flow into the central housing passageway through the inner nozzle receiver and then through the outer nozzle receiver to the atmosphere before the tip of the moving fuel-dispensing pump nozzle thereafter passes through the inner nozzle receiver and engages the inner closure door to move the inner closure door from the partly opened position to the opened position and for holding the inner closure door in the partly opened position during withdrawal of the tip of the moving fuel-dispensing pump nozzle from the central housing passageway formed in the nozzle-receiving housing after a fuel tank associated with the filler neck closure assembly has been refueled even though the moving fuel-dispensing pump nozzle has disengaged the inner closure door so that any droplets of fuel that are discharged from the moving fuel-dispensing pump nozzle as the moving fuel-dispensing pump nozzle is withdrawn flow under gravity past the partly opened inner closure door and through the inner nozzle receiver out of the central housing passageway to avoid formation of unwanted pools of liquid fuel in the central housing passageway after movement of the inner closure door to the normally closed position,
wherein the nozzle-actuated door opener is coupled to the side wall of the nozzle-receiving housing, wherein the nozzle-actuated door opener is coupled at one end to the side wall and linked at an opposite end to the inner closure door, and
wherein the nozzle-actuated door opener includes a door mover and a mover mount, the mover mount is coupled to the side wall, the door mover comprises, in sequence, outer, middle, and inner segments, the outer segment is coupled to the mover mount and arranged to lie between the top and bottom portions of the nozzle-receiving housing, the inner segment is arranged to contact the inner closure door without being coupled permanently to the inner closure door, and the middle segment is arranged to interconnect the outer and inner segments.

2. The assembly of claim 1, wherein the door mover is made of an elastic deformable material and the outer and middle segments cooperate to form nozzle-engagement means for engaging a moving fuel-dispensing pump nozzle in the central housing passageway of the nozzle-receiving housing to deform elastically and change the shape of the door mover from a contracted shape associated with the normally closed position of the inner closure door to a relatively longer expanded shape associated with the partly opened position of the inner closure door and a still longer elongated shape associated with the opened position of the inner closure door.

3. The assembly of claim 2, wherein a free end of the inner segment of the door mover is arranged to engage the inner closure door and to apply a movement-inducing force to the inner closure door to cause the inner closure door to move from the closed position to the partly opened position as the shape of the door mover changes from the contracted shape to the relatively longer expanded shape in response to movement of the tip of a moving fuel-dispensing pump nozzle in the central housing passageway toward the inner nozzle receiver formed in the bottom portion of the nozzle-receiving housing.

4. The assembly of claim 2, wherein a free end of the inner segment of the door mover is arranged to retain the inner closure door temporarily in the partly opened position during withdrawal of the moving fuel-dispensing pump nozzle from the central housing passageway and engagement of the moving fuel-dispensing pump nozzle and the door mover and after disengagement of the moving fuel-dispensing pump nozzle and the inner closure door to allow any droplets of fuel existing the tip of the moving fuel-dispensing pump nozzle to fall under gravity out of the central housing passageway through the inner nozzle receiver past the inner closure door in the partly opened position.

5. The assembly of claim 2, wherein the outer segment of the door mover extends from the side wall of the nozzle-receiving housing to form an acute angle that is reduced when the door mover changes from the contracted shape to the expanded shape and further reduced when the door mover changes from the expanded shape to the elongated shape.

6. The assembly of claim 2, wherein the inner segment of the door mover extends from the middle segment toward the inner nozzle receiver and away from a portion of the side wall that is coupled to the mover mount.

7. The assembly of claim 2, wherein the middle segment of the door mover extends from the outer segment toward the side wall of the nozzle-receiving housing and cooperates with the outer segment to form an obtuse angle therebetween that is increased when the door mover changes from the contracted shape to the expanded shape and further increased when the door mover changes from the expanded shape to the elongated shape.

8. The assembly of claim 7, wherein the door mover further comprises a torsion spring arranged to engage the outer and middle segments to bias the door mover toward the contracted shape.

9. The assembly of claim 8, wherein the outer segment of the door mover extends from the side wall of the nozzle-receiving housing to form an acute angle that is reduced when the door mover changes from the contracted shape to the expanded shape and further reduced when the door mover changes from the expanded shape to the elongated shape.

10. The assembly of claim 7, wherein the door mover further comprises a leaf spring arranged to engage the outer and middle segments to bias the door mover toward the contracted shape.

11. The assembly of claim 10, wherein the outer segment of the door mover extends from the side wall of the nozzle-receiving housing to form an acute angle that is reduced when the door mover changes from the contracted shape to the expanded shape and further reduced when the door mover changes from the expanded shape to the elongated shape.

12. The assembly of claim 7, wherein the door mover further comprises a compression spring arranged to engage the side wall of the nozzle-receiving housing and at least one of the outer and middle segments to bias the door mover toward the contracted shape.

13. The assembly of claim 12, wherein the outer segment of the door mover extends from the side wall of the nozzle-receiving housing to form an acute angle that is reduced when the door mover changes from the contracted shape to the expanded shape and further reduced when the door mover changes from the expanded shape to the elongated shape.

14. A fill tube for conducting liquid fuel to the fuel tank of a passenger vehicle, the fill tube comprising
a filler neck formed to include a fuel-conducting passageway and
a filler neck closure assembly coupled to an outer end of the filler neck, the capless filler neck closure assembly including a nozzle-receiving housing forming a central housing passageway, an outer dust shield mounted for movement relative to the nozzle-receiving housing from a normally closed position blocking an outer nozzle receiver opening into the central housing passageway of the nozzle-receiving housing to an opened position allowing a fuel nozzle to pass through the outer nozzle receiver into the central housing passageway, an inner closure door mounted for movement relative to the nozzle-receiving housing from a normally closed position blocking an inner nozzle receiver opening into the fuel-conducting passageway of the filler neck to an opened position allowing a fuel nozzle to pass through the inner nozzle receiver into the fuel-conducting passageway of the filler neck, and a nozzle-actuated door opener configured to provide opener means for moving the inner closure door from the closed position to a partly opened position when a fuel-dispensing pump nozzle is moved inwardly into the central housing passageway of the nozzle-receiving housing past the outer dust shield but before the fuel nozzle engages the inner closure door so that pressurized fuel vapor is vented from the fuel tank via the filler neck during insertion of the fuel nozzle into the filler neck to initiate a tank refueling activity and for holding the inner closure door in the partly opened position when a fuel nozzle is withdrawn from a position inserted past the inner closure door and is out of engagement with the inner closure door at the conclusion of a tank refueling activity so that fuel droplets dripping from the fuel nozzle are drained past the inner closure door and into the filler neck toward the fuel tank.

15. The fill tube of claim 14, wherein the opener means includes a door mover that comprises an outer segment, a middle segment that extends from the outer segment, and an inner segment that extends from the middle segment, the outer segment and the middle segment cooperate to provide nozzle-engagement means arranged to be engaged by a fuel nozzle moving in the central housing passageway of the nozzle-receiving housing so that the door mover is changed from a contracted shape associated with the closed position of the inner closure door to an expanded shape having a relatively longer length along the nozzle-receiving housing associated with the partly opened position of the inner closure door when a fuel nozzle is moved into the central housing passageway of the nozzle-receiving housing, and the inner segment is arranged to engage the inner closure door to push the inner closure door from the closed position to the partly opened position when the nozzle engagement means is changed to the expanded shape.

16. The fill tube of claim 15, wherein the nozzle-engagement means is made from an elastic deformable material configured to deform elastically when engaged by a fuel nozzle moving in the central housing passageway of the nozzle-receiving housing to cause movement of the door mover from the contracted shape to the expanded shape.

17. The fill tube of claim 16, wherein outer segment, the middle segment, and the inner segment of the door mover cooperate to provide a monolithic component made from an elastic deformable material biased toward the contracted shape associated with the closed position of the inner closure door.

18. The fill tube of claim 15, wherein the door mover is arranged to lie in the central housing passageway of the nozzle-receiving housing when in the contracted shape associated with the closed position of the inner closure door and extends through the inner nozzle receiver aperture when in the expanded shape associated with the partly opened position of the inner closure door.

19. The fill tube of claim 14, wherein the nozzle-receiving housing includes a side wall that extends around the central housing passageway and an inner wall that extends into the central housing passageway from the side wall, and the inner wall is formed to include the inner nozzle receiver aperture.

20. The fill tube of claim 14, wherein the opener means includes a door mover movable from a contracted shape associated with the closed position of the inner closure door to an expanded shape having a relatively longer length along the nozzle-receiving housing associated with the partly opened position of the inner closure door when a fuel nozzle is inserted into the central housing passageway to push the inner door from the closed position to the partly opened position before the fuel nozzle engages the inner closure door.

21. The fill tube of claim 20, wherein the door mover includes an outer segment that extends from a side wall of the nozzle-receiving housing to form an acute angle with the side wall that is reduced when the door mover moves from the contracted shape to the expanded shape, a middle segment that extends from the outer segment back toward the side wall and forms an obtuse angle with the outer segment that is increased when the door mover moves from the contracted shape to the expanded shape, and an inner segment that extends from the middle segment toward the inner closure door and away from the side wall.

22. The fill tube of claim 20, wherein the door opener is movable from the expanded shape to an elongated shape have a relatively longer length along the nozzle-receiving housing associated with the opened position of the inner closure door when a fuel nozzle is inserted into the central housing passageway and into engagement with the inner closure door to push the inner closure door to the opened position, the door mover includes an outer segment that extends from a side wall of the nozzle-receiving housing to form an acute angle with the side wall that is reduced when the door mover moves from the contracted shape to the expanded shape and is further reduced when the door mover moves from the expanded shape to the elongated shape, a middle segment that extends from the outer segment back toward the side wall and forms an obtuse angle with the outer segment that is increased when the door mover moves from the contracted shape to the expanded shape and that is further increased when the door mover moves from the contracted shape to the elongated shape, and an inner segment that extends from the middle segment toward the inner fuel nozzle receiver aperture and away from a portion of the side wall from which the outer segment extends.

* * * * *